Patented Mar. 15, 1927.

1,620,761

UNITED STATES PATENT OFFICE.

HARRY H. HENDRICKSON, OF ARAVAIPA, ARIZONA, ASSIGNOR TO GRAND CENTRAL MINING COMPANY, OF PHOENIX, ARIZONA, A CORPORATION OF DELAWARE.

METHOD OF PREPARING ORES FOR FLOTATION.

No Drawing.   Application filed September 9, 1926.   Serial No. 134,576.

The invention relates to an improved method of preparing low grade ores, more particularly lead ores, for flotation to largely increase the recovery of metallic values and thereby render the treatment of such low grade ores commercially practicable. To this end, the invention comprises treating the ores with a sulphidizing agent in the presence of water maintained at a temperature materially above the mean or average summer temperature and, preferably, at approximately 160 degrees Fahrenheit.

As indicated, the invention is especially applicable to treatment of low grade ores and deposits containing lead in oxidized form, running on an average of about 100 lbs. of lead per ton or approximately 5%, together with small amounts of other metals, such as silver and gold. Although many attempts were made to recover the values in ores and deposits containing lead in the approximate proportions stated, including the usual chemical treatments and flotation methods for the recovery of lead and similar metals, none of the operations were successful in recovering the lead in sufficient quantities to render the operations commercially profitable, and, as a matter of fact, the various steps to recover the lead were conducted at an actual loss until the present invention was developed and perfected and which has resulted in a substantially uniform extraction of 60 to 65% of the lead values, when the present invention was associated with the regulation flotation process employed in concentrating low grade ores, dump tailings and similar deposits.

In carrying out the instant invention, the ores or mineral bearing materials in comminuted form are agitated in a suitable mixing apparatus, such as a concrete mixer, a vertical mixer or a rod mill with proper proportions of sulphidizing reagent, such, for example, as sodium sulphide, and water in sufficient quantity to form a pulp of a density from 3 to 1 to 1 to 1, and maintaining the temperature of the pulp during the sulphidizing reaction at a relatively high temperature, i. e. approximately 160 degrees Fahrenheit, the resultant pulp containing sulphidized values, more particularly lead, in condition to respond to the usual flotation methods of concentration to give a lead recovery of from 60 to 65%. A practical application of the method was applied to the material from the dump of a low grade silver mine, a systematic sampling of the material of the dump indicating that it contained an average of 100 lbs. of lead (5% in the form of oxidized lead material), 3½ oz. of silver and .045 oz. of gold, to the ton. Many attempts to recover the metallic values by flotation, preceded by the usual and customary sulphidizing operations, were made, but, in no instance, was the recovery sufficient to avoid an actual loss, the quantity of lead recovered being insufficient to pay for the labor and materials employed in the operation. When, however, the preliminary sulphidizing reaction was carried out, with the pulp maintained at a temperature of approximately 160 degrees Fahrenheit, a uniformly successful commercial recovery was obtained. The material from the dump was deposited in the mixer and 5 lbs. of sodium sulphide to the ton of crude ore, together with water in an amount approximately equal to that of the ore, and the resultant pulp, during the agitation necessary to produce the sulphidizing of the mineral values, was maintained at the temperature aforesaid, to wit, approximately 160 degrees Fahrenheit. After the thorough agitation of the pulp and the sulphidizing of the mineral values had been effected, under the temperature conditions indicated, the pulp was discharged from the mixer and approximately 1 lb. of wood creosote, ½ lb. shale oil and $\frac{1}{10}$ lb. of potassium xanthate per ton were added together with water in an amount sufficient to give a pulp density of 3 to 1. The pulp was then pumped, preferably by a centrifugal pump, to a launder and thence distributed to standard mechanical flotation cells, when it was found that the recovery of lead was raised to an average of 66% or to a point where the operation became commercially profitable. The following is a typical example of the dump material treated with or without hot water:

1. A lead carbonate ore averaging 5% lead was subjected to the following treatment:

Pulp density, 1:1; temperature, 80 degrees

Fahrenheit; lbs. creosote per ton, .8; lbs. shale oil per ton, .6; lbs. potassium xanthate, .05; lbs. sodium sulphide, 6.00.

The results were as follows:

|  | Per cent Pb. |
|---|---|
| Heads | 5 |
| Tails | 3.5 |
| Concentrates | 33 |

2. The same ore, treated with the same reagents in the same amounts and the same pulp density, to wit, water heated to a temperature of 160 degrees Fahrenheit during the sulphidizing operation, gave the following results:

|  | Per cent Pb. |
|---|---|
| Heads | 5 |
| Tails | 1.8 |
| Concentrates | 44 |

From the foregoing, it is evident that the ordinary and usual sulphidizing operation and the subsequent flotation, will not recover enough of the lead to make the enterprise a profitable one. The first of the two examples stated above is not commercially profitable, but indicates an actual financial loss, as the value of the lead recovered is not sufficient to defray the expenses of the recovery. On the other hand, the second example, involving the heating of the pulp during the sulphidizing action to approximately 160 degrees Fahrenheit resulted in a highly satisfactory commercial recovery of the lead by the standard flotation operation, which is both practicable and profitable. In other words, the maintenance of the pulp during the sulphidizing reaction at the relatively high temperature of 160 degrees Fahrenheit, as compared with the common practice of effecting sulphidization with pulp temperatures at approximately that of the atmosphere, marks the difference between practical failure and commercial success in the preliminary treatment and preparation of low grade ores or metal bearing material of the character indicated.

While the heating of the water or pulp to approximately 160 degrees Fahrenheit and maintaining the temperature at that point has proved most effective and economical in producing the maximum recovery of lead, it is to be understood that the practice of the invention is not limited to this specific temperature, as temperatures ranging from 130 degrees Fahrenheit to somewhat below the boiling point of water have produced commensurately good recoveries.

What I claim is:

1. The method of preparing ores for flotation, which comprises treating the comminuted ore with a sulphidizing agent and water heated above 130 degrees Fahrenheit.

2. The method of preparing ores for flotation, which comprises treating the comminuted ore with aqueous solution of a sulphidizing agent heated above 130 degrees Fahrenheit.

3. The method of preparing ores for flotation, which comprises treating the comminuted ore with sodium sulphide and water heated above 130 degrees Fahrenheit.

4. The method of preparing ores for flotation, which comprises agitating substantially equal weights of comminuted ore and water heated above 130 degrees Fahrenheit in the presence of a sulphidizing agent.

5. The method of preparing ores for flotation, which comprises agitating substantially equal weights of comminuted ore and water heated above 130 degrees Fahrenheit in the presence of sodium sulphide.

6. The method of preparing ores for flotation, which comprises treating the ores with a sulphidizing bath heated above 130 degrees Fahrenheit.

7. The method of preparing ores for flotation, which comprises treating the comminuted ore with a sulphidizing agent and water at a temperature of approximately 160 degrees Fahrenheit.

8. The method of preparing ores for flotation, which comprises treating the comminuted ore with sodium sulphide and water at a temperature of approximately 160 degrees Fahrenheit.

9. The method of preparing ores for flotation, which comprises agitating substantially equal weights of comminuted ore and water at a temperature of approximately 160 degrees Fahrenheit in the presence of a sulphidizing agent.

In testimony whereof I affix my signature.

HARRY H. HENDRICKSON.